US00RE38973E

(19) United States
(12) Reissued Patent
Smith

(10) Patent Number: US RE38,973 E
(45) Date of Reissued Patent: Feb. 14, 2006

(54) SWEEPER

(76) Inventor: Keith E. Smith, 1612 S. Combee Rd., Lakeland, FL (US) 33801

(21) Appl. No.: 10/633,461

(22) Filed: Jul. 31, 2003

Related U.S. Patent Documents

Reissue of:
(64) Patent No.: 4,926,517
Issued: May 22, 1990
Appl. No.: 07/315,300
Filed: Feb. 24, 1989

(51) Int. Cl.
*E01H 1/02* (2006.01)

(52) U.S. Cl. ..... 15/82; 15/179; 15/392
(58) Field of Classification Search ..... 15/49.1, 15/50.3, 52.1, 82–86, 179, 181–183, 383, 15/389, 392; 37/233
See application file for complete search history.

(56) References Cited

U.S. PATENT DOCUMENTS

| | | | | |
|---|---|---|---|---|
| 599,937 | A | | 3/1898 | Jones et al. |
| 1,276,953 | A | | 8/1918 | Parker |
| 1,322,341 | A | | 11/1919 | Ream |
| 2,460,216 | A | | 10/1949 | Dalton |
| 3,233,274 | A | | 2/1966 | Kroll |
| 3,276,109 | A | | 10/1966 | Mortensen |
| 3,284,830 | A | * | 11/1966 | Kroll |
| 3,310,825 | A | | 3/1967 | Tamny |
| 3,325,849 | A | | 6/1967 | Waters |
| 3,812,551 | A | | 5/1974 | Mortensen |
| 3,879,786 | A | * | 4/1975 | Larkin |
| 3,943,593 | A | | 3/1976 | Gould et al. |
| 3,948,104 | A | | 4/1976 | Stephens |
| 4,011,722 | A | | 3/1977 | Drake |
| 4,114,401 | A | | 9/1978 | Van Hoose |
| 4,191,032 | A | | 3/1980 | August |
| 4,636,180 | A | | 1/1987 | Runkle |
| 4,885,949 | A | | 12/1989 | Barber, Jr. |
| 4,912,798 | A | | 4/1990 | Ganzmann |
| 4,913,151 | A | | 4/1990 | Harui et al. |
| 4,926,517 | A | | 5/1990 | Smith |
| 5,076,367 | A | | 12/1991 | Reincke |
| 5,097,356 | A | | 3/1992 | Paulsen |
| 5,409,332 | A | | 4/1995 | Chabot, Jr. et al. |
| 5,467,720 | A | | 11/1995 | Korenaga et al. |
| 5,571,105 | A | | 11/1996 | Gundolf |
| 5,742,967 | A | | 4/1998 | Geissler |
| 5,769,618 | A | | 6/1998 | Ono et al. |
| 5,884,426 | A | | 3/1999 | Ishida |
| 6,551,060 | B1 | | 4/2003 | Mordue et al. |

FOREIGN PATENT DOCUMENTS

| | | |
|---|---|---|
| GB | 3720 | * of 1867 |

* cited by examiner

*Primary Examiner*—Randall Chin
(74) *Attorney, Agent, or Firm*—Frijouf, Rust & Pyle, P.A.

(57) ABSTRACT

A sweeper includes a support structure having parallel arms which may be moved apart to allow a brush held between the arms to be replaced. Each of the arms has a hub mounted thereon by a universal joint which provides automatic alignment of the two hubs to provide a single axis of rotation for the brush. One of the hubs is connected to a hydraulic drive motor and includes a plurality of slots, one of which receives a drive lug on the interior of the brush which is preferably of the type having a core of a thin metal tube. A raising and lowering mechanism comprises a parallelogram having a hydraulic cylinder in the center for controlling the configuration of the parallelogram. As the brush is raised its support mechanism remains parallel to the vehicle and moves closer to it. A unique stop element is mounted to the hydraulic cylinder to provide a minimum height for the sweeper.

10 Claims, 3 Drawing Sheets

FIG. 1
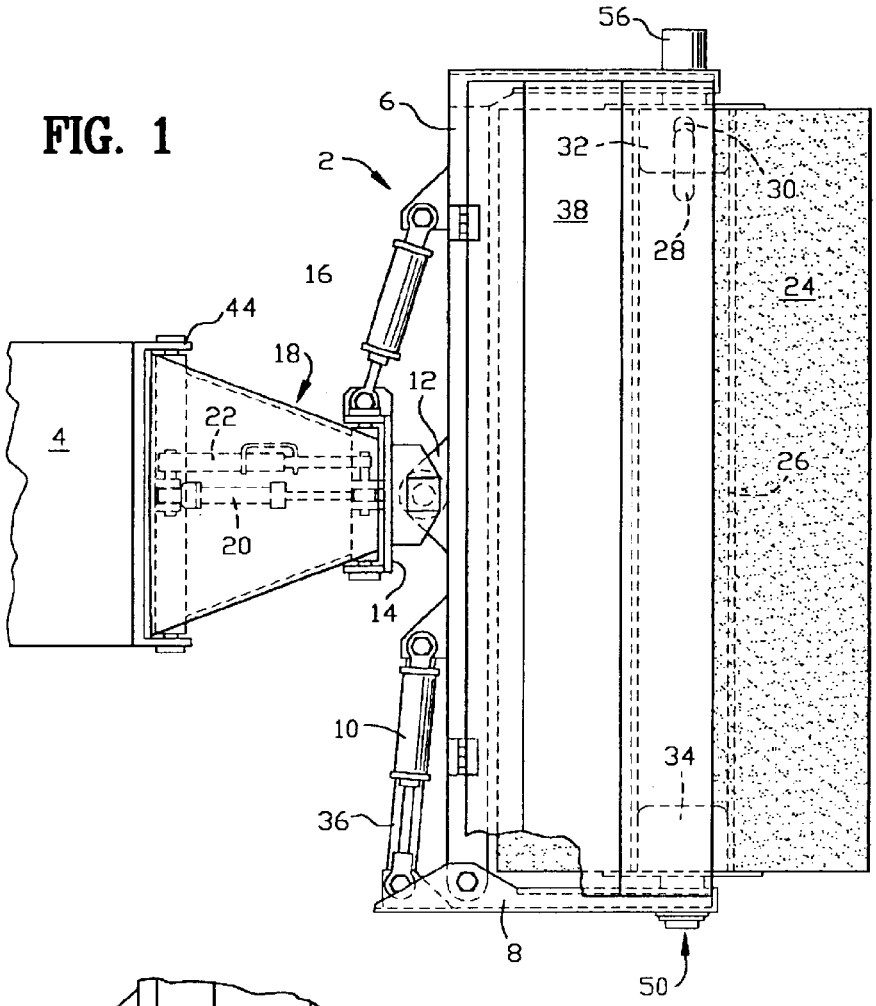
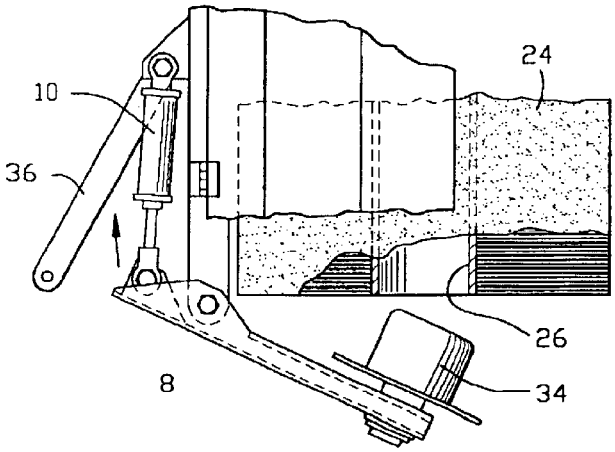
FIG. 2

SWEEPER

Matter enclosed in heavy brackets [ ] appears in the original patent but forms no part of this reissue specification; matter printed in italics indicates the additions made by reissue.

TECHNICAL FIELD

This invention relates to the art of sweepers. In particular, the invention relates to sweepers used for large areas, such streets and which use replaceable brushes.

BACKGROUND ART

Street sweepers of the type having an elongate, essentially cylindrical brush which rotates about a horizontal axis are known. These sweepers are useful for cleaning large areas, such as parking lots or streets, and are typically mounted on the front of a vehicle to be pushed ahead of it. The brush is driven such that the bristles move away from the vehicle as they engage the surface being swept.

As the bristles become worn, it is necessary to replace the brush by removing it from a support structure and installing a new brush. In some prior art sweepers, it is necessary that drive or idler brackets be disassembled to permit the brush to be removed. This is difficult and requires a substantial amount of time.

The sweeper shown in U.S. Pat. No. 3,284,830 (Kroll) has a drive hub mounted to a door which forms the side of a compartment which supports the brush. When the door is opened, the brush may be removed from the compartment and a new brush installed.

Other U.S. Pat. Nos. showing sweepers of interest are: 3,310,825 (Tamny); 3,276,109 (Mortensen); 3,812,551 (Mortensen); and 3,879,786 (Larkin).

SUMMARY OF THE INVENTION

The prior art sweepers do not facilitate the installation of new brushes and generally do not permit the use of brushes having a core formed of a thin metal tube. For example, the sweeper shown in the Kroll patent uses a brush comprising a thick tube with tufts in rows running from one end of the tube to the other. Spaces between the strips of bristles have drive slots for receiving lugs on a drive hub. Because the Kroll sweeper has no arrangement providing for exact alignment of the drive and idler hubs, use of a brush having a thin walled metal core is not possible.

In accordance with the invention, a sweeper includes a support structure which is generally U-shaped when the brush is held in an operative position. The ends of the arms of the support structure have idler and drive structures, respectively, for receiving opposite ends of the brush. One arm of the support structure is pivotally mounted to permit removal of the idler end from the brush and to allow the brush to be disengaged from the opposite, drive end. A new brush may then be inserted easily and the pivotal arm rotated to a position parallel to the other arm to engage the broom.

The idler and drive hubs are mounted to the arms by universal joints, thus providing for automatic alignment of the idler and drive hubs to provide a single axis of rotation for the brush. This permits the use of a brush having a thin metal tube without the necessity of providing a solid shaft passing through the center of the tube and connecting the drive and idler ends.

A drive lug is welded to the interior of the metal tube and engages a slot in the drive hub. Preferably, the drive hub has a plurality of slots whereby a subsequent slot may the used when the first slot has become worn. This increases the life of a drive hub.

The pivotal arm is preferably controlled by a hydraulic cylinder, and the cylinder may have a safety strap secured across its ends when the pivotal arm is in the operational position to prevent accidental rotation of the arm.

A raising and lowering mechanism is connected between the support structure and the vehicle. This mechanism is preferably a parallelogram comprised of a mounting bracket on the vehicle, a mounting bracket on the support structure, and upper and lower parallel arms. A hydraulic cylinder is located within the parallelogram for raising or lowering the brush. A stop mechanism is arranged parallel to the hydraulic cylinder to adjust the lowermost position of the brush.

An object of this invention is to provide a sweeper wherein removal or installation of a brush are facilitated.

Another object of this invention is to provide a sweeper having a raising and lowering mechanism which maintains a brush mechanism parallel and closer to the vehicle as it is raised.

BRIEF DESCRIPTION OF THE DRAWINGS

FIG. 1 is a top view of a sweeper in accordance with the invention.

FIG. 2 is a partial top view of the sweeper shown in FIG. 1.

DETAILED DESCRIPTION OF THE INVENTION

Figure 3:
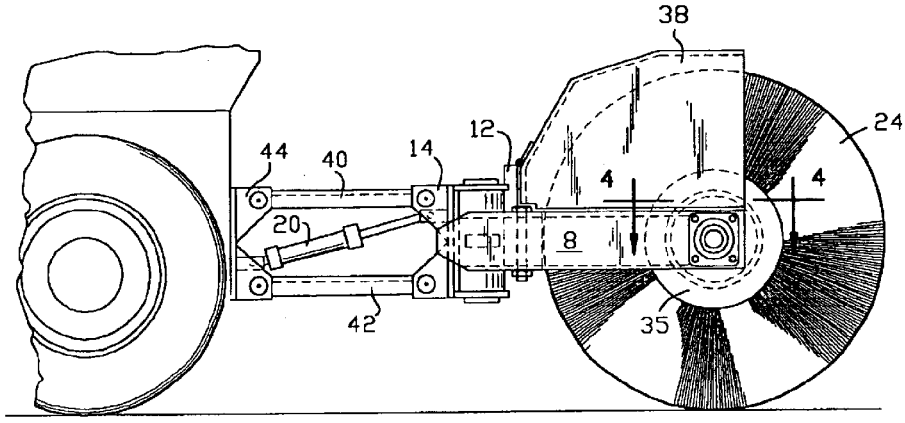
FIG. 3 is a side view of the sweeper shown in FIG. 1.

With reference to FIG. 1, a sweeper 2 in accordance with the invention is shown attached to a vehicle 4. The sweeper comprises a support structure having a first part 6 which is L-shaped and a second part which comprises a pivotal arm 8 attached to the first part 6. A hydraulic cylinder is connected between the first part 6 and an end of the pivotal arm 8 for driving arm 8 about its pivotal connection with the first part 6 of the support. A bracket 12 is mounted to the firs&: part 6 and provides a hinge connection to a mounting element 14. A hydraulic cylinder 16 is connected between the mounting element 14 and the first part 6 for controlling the orientation of the sweeper with respect to the vehicle about a vertical axis. Mounting element 14 is one part of a parallelogram arrangement 18 which raises or lowers the sweeper 2. A hydraulic cylinder 20 is used to control the shape of the parallelogram 18, and a stop element 22 permits setting the minimum height of the sweeper. The operation of the raising or lowering mechanism will be described more thoroughly with respect to FIGS. 3 and 6 through 8. A brush includes bristles 24 and a thin metal tube 26. A drive lug 28 is welded to the interior of the metal tube 26 and engages one of a plurality of slots 30 in a drive hub 32. Drive hub 32 is connected to an arm of the first part of the support by a universal joint as shown more clearly in FIG. 5.

A plurality of slots 30 is provided such that the drive lug 28 may be engaged in another of the slots when a first slot becomes worn. Thus, the drive hub need be replaced only after all of the slots are worn, and the lifetime of the drive hub is increased. The drive end preferably includes a removable bumper (not shown) which attaches to part 6 and extends over the motor to protect it.

The opposite end of the metal tube 26 receives an idler hub 34 which is attached to arm 8 by a universal joint which will be described in more detail with respect to FIG. 4. With reference to FIG. 2, arm 8 is shown pivoted outwardly such that idler hub 3 is displaced from the end of metal tube 26. Arm 8 is pivoted outwardly by activation of hydraulic cylinder 10, the control of which may be in the cab of the vehicle but is preferably mounted on the support structure to be easily accessible to a workman replacing the brush. A strap 36 is used to secure the arm 8 in its closed position by mounting on the same bolts which secure the opposite ends of hydraulic cylinder 10. When it is desired to remove the brush, strap 36 is removed from one end of the hydraulic cylinder 10, thus allowing hydraulic cylinder 10 to be activated to pull the end of arm 8 inwardly and pivot it to the orientation shown in FIG. 2.

The dimensions of the hub, the universal joint, and the arm are preferably such that the hub 34 is aligned with the axis of rotation of the brush throughout the pivotal movement of arm 8. When arm 8 is pivoted inwardly, after installation of a new brush, hub 34 engages tube 26 and automatically aligns itself with the axis of rotation of the brush such that it may be easily slid into the tube. Hub 34 is shown in FIG. 2 extending generally perpendicular to arm 8. In practice, the hub would remain generally aligned with the axis of the brush or would become so immediately upon engaging tube 26.

With reference to FIG. 3, a hood 38 is mounted to first part 6 of the support structure by hinges to permit it to be pivoted rearward to expose the brush during installation or removal.

The parallelogram arrangement 18 is shown more clearly in FIG. 3 to comprise an upper arm 40 and a lower arm 42. Respective ends of these arms are connected between the mounting bracket 44 on vehicle 4 and mounting element 14. Extension of hydraulic cylinder 20 will cause the mounting element 14 to move upwardly, thus raising the support structure and the brush. Conversely, allowing shortening of the hydraulic cylinder 20 permits controlled lowering of the support structure and the brush.

The parallelogram arrangement for raising and lowering the brush is particularly useful with the sweeper of the invention. As the cylinder is lengthened, the brush and its associated support parts 6 and 8 remain parallel to the ground and move closer to the vehicle as they move upward. This allows the vehicle to be driven up ramps (not shown) leading to a trailer (not shown) without bumping the brush against the ramps. Known sweepers simply pivotally mount a brush mechanism to the front of the vehicle resulting in an orientation wherein the brush ordinarily bumps into the ramps when being driven onto the trailer ramps.

Figure 4:
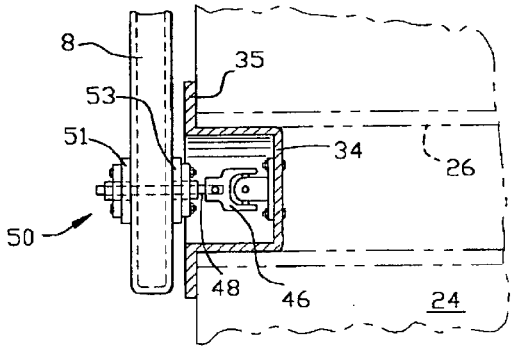
FIG. 4 is a cross-section take along line 4—4 of FIG. 3.
Figure 5:
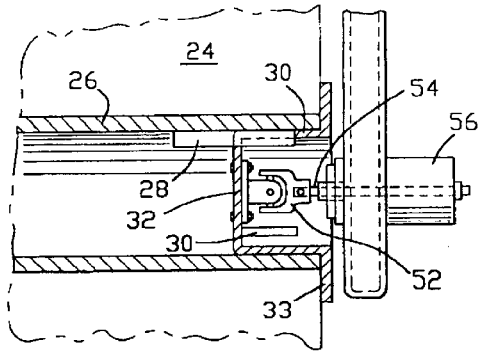
FIG. 5 is a cross-section of the same part as that of FIG. 4 but taken at the opposite end of the sweeper.

With reference to FIGS. 4 and 5, idler hub 34, which includes a flange 35, is attached to a universal joint 46 at an interior wall of the hub 34. One end of the universal joint 46 is secured to shaft 48 which is supported in a bearing 50 which is in turn bolted to the pivotal arm 8. Bearing 50 includes pillow blocks 51 and 53 which are bolted to opposite sides of arm 8. Each of the pillow blocks is of a type which is known in the art and includes a bearing (not shown) which would alone permit some degree of non-axial motion of shaft 48. The combination of two pillow blocks, however, prevents any such non-axial motion. Drive hub 32, which includes a flange 33 is bolted to one end of a universal joint 52. The other end of universal joint 52 is mounted to shaft 54 from hydraulic drive motor 56 which is a mounted on the first part of the support structure. Drive lug 28 engages a slot 30 such that activation of drive motor 56 to rotate drive hub 32 drives the brush accordingly.

The provision of universal joints 46 and 52 causes drive hub 32 and idler hub 34 to automatically align to provide a common axis of rotation for the brush.

Figure 6:
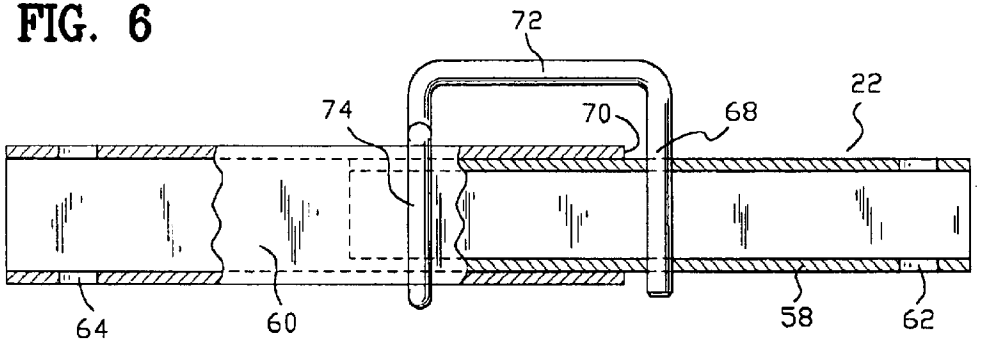
FIG. 6 is a top view in partial cross-section of a stop mechanism for use in the raising and lowering structure of the invention.
Figure 7:
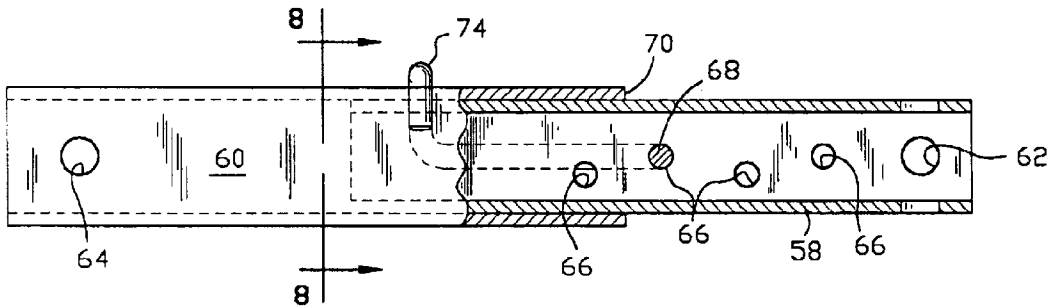
FIG. 7 is a side view of the stop mechanism shown in FIG. 6.
Figure 8:
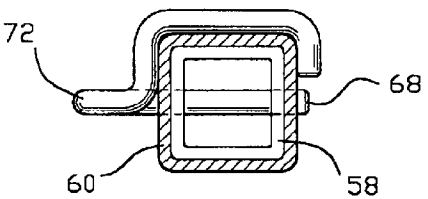
FIG. 8 is a cross-section taken along line 8—8 of FIG. 7.

With reference to FIGS. 6 through 8, stop 22 comprises a first tube 58 which slides within a second tube 60. First tube 58 has mounting holes 62 while second tube 60 has mounting holes 64. Respective ends of the stop element 22 are mounted to the mounting bracket 44 and mounting element 1 such that element 22 is parallel to the hydraulic cylinder 20. Inner element 58 includes holes 66 which receive a transverse pin 68. This pin is placed in a selected one of the holes 66 to adjust the minimum length of stop element 22. Holes 66 are in two rows to increase the strength of the material between the holes.

As shown in FIG. 6, when inner element 58 slides within outer element 60 such that an end 70 of the outer element engages transverse pin 68, the stop element cannot be shortened further, and the sweeper is accordingly held at that height. The sweeper may be raised for transport by activating hydraulic cylinder 20, thus lengthening stop element 22.

Referring to FIG. 8, transverse pin 68 is one part of an element comprising a handle portion 72 and a hook portion 74. Handles portion 72 allows one to grasp the element and to rotate it to such a position that hook portion 74 is disengaged from outer element 60. This allows transverse pin 68 to be removed an re-inserted into another of the holes 66. When the hook portion 74 is in the position shown in FIG. 8, transverse pin 68 is securely retained in the selected hole 66.

Modifications of the invention within the scope of the appended claims will be apparent to those skilled in the art.

I claim:

1. Sweeping apparatus comprising support means for supporting a brush for rotation about a generally horizontal axis and means for mounting said support means on a vehicle, wherein said support means comprises first and second arms, means for moving said [first] *second* arm with respect to said [second] *first* arm between a first position wherein said [first] *second* arm is spaced from said [second] *first* arm by a distance such that said brush is received between said arms and a second position wherein said [first] *second* arm is spaced from said [second] *first* arm such that said brush is released from between said arms, drive means mounted on said first arm by universal joint means for engaging one end of said brush and for rotating said brush about an axis extending between said first and second arms, and idler means mounted on said second arm by universal joint means for engaging an opposite end of said brush.

2. Sweeping apparatus according to claim 1 wherein said second arm is mounted for rotation with respect to said first arm and further comprising means for rotating said second arm with respect to said first arm.

3. Sweeping apparatus according to claim 2 wherein said means for rotating said second arm comprises a hydraulic cylinder.

4. Sweeping apparatus according to claim 2 further comprising means for restricting the movement of said means for rotating said second arm.

5. Sweeping apparatus according to claim 1 wherein said drive means comprises hub means for fitting within a hollow core of said brush, said hub means having at least one slot therein for receiving a lug on said brush.

6. Sweeping apparatus according to claim 5 wherein said drive means and said idler means further comprise flanges for engaging outer edges of said brush.

7. Sweeping apparatus according to claim 1 wherein said means for mounting said support means on a vehicle comprises upper and lower arms each of which is mounted at respective opposed ends to said support means and to said vehicle and elongation means between said upper and lower arms for causing adjacent ends of said upper and lower arms to raise or lower according to the length of said elongation means.

8. Sweeping apparatus according to claim 7 further comprising stop means attached to said elongation means for limiting the movement of said elongation means, said stop means comprising a first element which slides within a second element, said first element having a plurality of holes therein for receiving a transverse pin for selectively engaging said second element.

9. Sweeping apparatus according to claim 8 further comprising said transverse pin, wherein said transverse pin comprises a first part which extends through one of said holes and a second part which hooks over said second part to retain and first part in said one of said holes.

10. Sweeping apparatus according to claim 1 wherein said support means comprises means for rotating said brush about a vertical axis.

* * * * *